United States Patent
Tanabe et al.

[11] Patent Number: 6,092,509
[45] Date of Patent: Jul. 25, 2000

[54] ACCUMULATOR TYPE FUEL INJECTION SYSTEM

[75] Inventors: Keiki Tanabe, Yokohama; Susumu Kohketsu, Tokyo, both of Japan

[73] Assignee: Mitsubishi Jidosha Kogyo Kabushiki Kaisha, Japan

[21] Appl. No.: 09/443,009

[22] Filed: Nov. 18, 1999

[30] Foreign Application Priority Data

| Nov. 19, 1998 | [JP] | Japan | 10-329240 |
| Feb. 18, 1999 | [JP] | Japan | 11-040479 |

[51] Int. Cl.$^7$ .................................................. F02M 37/04
[52] U.S. Cl. ........................................... 123/447; 123/467
[58] Field of Search .................... 123/447, 446, 123/467, 458, 514

[56] References Cited

U.S. PATENT DOCUMENTS

| 5,146,894 | 9/1992 | Rembold | 123/447 |
| 5,619,969 | 4/1997 | Liu | 123/447 |
| 5,619,970 | 4/1997 | Collingborn | 123/447 |
| 5,622,152 | 4/1997 | Ishida | 123/447 |
| 5,642,714 | 7/1997 | Buckley | 123/447 |
| 5,732,679 | 3/1998 | Takahasi | 123/447 |
| 5,839,413 | 11/1998 | Krause | 123/447 |

*Primary Examiner*—Carl S. Miller
*Attorney, Agent, or Firm*—Rossi & Associates

[57] ABSTRACT

During a transitional operation of an engine in which an engine load is changed suddenly from a high load to a low load, a control operation for extending an opening period of a change-over valve which is adapted to switch a low-pressure accumulator and a high-pressure accumulator from one to the other during a fuel injection operation is carried out to increase a flow rate of a fuel supplied to the low-pressure accumulator and thereby reduce the pressure in the high-pressure accumulator, whereby a response delay of the fuel pressure in the high-pressure accumulator is minimized. During a transitional operation of the engine in which the engine is in an accelerated operation, the change-over valve is kept open until the fuel pressure in the low-pressure accumulator, which is connected to the portion of a fuel passage which is on the downstream side of the change-over valve adapted to switch the low-pressure accumulator and high-pressure accumulator from one to the other during a fuel injection operation, reaches an indicated level, and until a predetermined period of time elapses after the fuel injection finishing time, whereby the formation of a fuel pressure in the low-pressure accumulator is promoted to obtain injection condition suiting the operating condition of the engine.

12 Claims, 9 Drawing Sheets

ACCUMULATOR TYPE FUEL INJECTION SYSTEM

FIELD OF THE INVENTION

This invention relates to an accumulator type fuel injection system.

BACKGROUND OF THE INVENTION

An accumulator type fuel injection system is known which is adapted to stably supply a high-pressure fuel stored in an accumulator to each cylinder of a diesel engine, and in a broader operational range. However, when a fuel injection rate immediately after the starting of fuel injection is excessively high in such a fuel injection system, sudden explosion combustion is carried out in an initial stage of combustion. Consequently, not only the noise of operation of the engine but also the NOx content of an exhaust gas increases.

To eliminate such inconveniences, an accumulator type fuel injection system adapted to inject a fuel at a lower fuel injection rate in an initial stage of each fuel injection cycle has been proposed. The fuel injection system relating to this proposal is provided with, for example, a low-pressure accumulator adapted to store a low-pressure fuel therein, a high-pressure accumulator adapted to store a high-pressure fuel therein, a change-over valve communicated selectively with the low-pressure accumulator or high-pressure accumulator with an injector (fuel injection nozzle) to switch an injection rate, and a switch valve adapted to communicate and shut off a control chamber of the injector and a fuel tank with and from each other and thereby control the injection time.

Regarding the formation of a fuel pressure in an accumulator, there is, for example, an accumulator type fuel injection system adapted to obtain low-pressure and high-pressure fuels by using low-pressure and high-pressure pumps driven by an engine, and an accumulator type fuel injection system adapted to obtain a high-pressure fuel by a high-pressure pump, and a low-pressure fuel by regulating the pressure of the high-pressure fuel introduced into a low-pressure accumulator (Japanese Patent Laid-Open No. 93936/1994).

In the accumulator type fuel injection system disclosed in International Patent Laid-Open WO98/09068 and adapted to obtain a low-pressure fuel in a low-pressure accumulator from a high-pressure fuel in a high-pressure accumulator, a fuel passage connecting a change-over valve and an injector together is filled with a low-pressure fuel by closing, for example, an injection time controlling switch valve and an injection rate switching change-over valve, and the low-pressure fuel is supplied to a control chamber of the injector communicating with the fuel passage to keep the injector closed. When the injection starting time comes, the switch valve is opened to discharge the low-pressure fuel in the control chamber to a fuel tank, whereby the injector is opened to carry out initial low-pressure injection (which will hereinafter be referred to as low-pressure injection). When a low-pressure injection period passes, the change-over valve is opened to inject the high-pressure fuel, which is supplied from the high-pressure accumulator, from a nozzle and carry out main high-pressure injection (which will hereinafter be referred to as high-pressure injection). When the injection finishing time has comes, the change-over valve is closed. In the low-pressure accumulator, the pressure of the high-pressure fuel which has flowed from the fuel passage thereinto is regulated to obtain a low-pressure fuel.

The target pressures of the high-pressure fuel in the high-pressure accumulator and the low-pressure fuel in the low-pressure accumulator are regulated variably in accordance with the operating condition of the engine, and low-pressure injection and high-pressure injection which suit the operating condition of the engine are executed.

In such an accumulator type fuel injection system, the formation of fuel pressure in the low-pressure accumulator is carried out by utilizing the high-pressure fuel in the high-pressure accumulator, so that the formation of fuel pressure therein tends to delay during a transitional operation of the engine in which the operating condition of the engine suddenly changes by, for example, a sudden accelerator pedal stepping operation. Therefore, a change in level of an actual fuel pressure in the low-pressure accumulator delays with respect to a target level when the engine enters into such a transitional operating condition. Namely, a low-pressure fuel suiting a suddenly changing operating condition of the engine cannot be obtained, so that low-pressure injection cannot be carried out properly in some cases. In such a case, the fuel consumption and exhaust gas characteristics may be deteriorated.

When the fuel pressure in the high-pressure accumulator is reduced at the transitional time, for example, when the engine load condition is changed from a high-load condition to a low-load condition by returning an accelerator, reducing the fuel pressure in the high-pressure accumulator to a set level in a short period of time by reducing a response delay to as great an extent as possible is preferable for improving the exhaust gas characteristics and fuel consumption performance.

SUMMARY OF THE INVENTION

This invention aims at providing an accumulator type fuel injection system adapted to promote the formation of fuel pressure in low-pressure accumulator at the time of transitional operation of the engine, and execute proper low-pressure injection early.

This invention also aims at providing an accumulator type fuel injection control apparatus adapted to control when an engine is in a transitional operating condition the extending of the opening time of a change-over valve for switching a low-pressure accumulator and a high-pressure accumulator from one to the other during a fuel injection operation, and minimize a response delay of a fuel pressure in the high-pressure accumulator by reducing the pressure therein by increasing a flow rate of a fuel flowing therefrom into the low-pressure accumulator.

Therefore, an accumulator type fuel injection system is provided with a first accumulator adapted to store therein a high-pressure fuel pressurized by a fuel pump, a fuel injection nozzle connected to the first accumulator via a fuel passage and adapted to inject the fuel into a combustion chamber of an engine, a control valve adapted to control the discharging of the high-pressure fuel in the first accumulator into a downstream portion of the fuel passage, a second accumulator adapted to store therein a fuel the pressure of which is lower than that of the high-pressure fuel in the first accumulator, and connected via a branch passage to the portion of the fuel passage which is on the downstream side of the control valve, and a fuel control means adapted to open the control valve in the midst of a period in which the fuel injection nozzle is opened, close the control valve simultaneously with the closure of the fuel injection nozzle, set an indicated pressure of the fuel in the first accumulator in accordance with the operating condition of the engine, and delay the closing time of the control valve when a rate of decrease of the indicated pressure is not lower than a predetermined level.

According to this accumulator type fuel injection system, an indicated pressure of the fuel in the first accumulator is set in accordance with the operating condition of the engine, and the closing time of the control valve is delayed when a rate of decrease of the indicated pressure is not lower than a predetermined level, whereby a flow rate of the fuel flowing from the first accumulator to the second accumulator is increased at the transitional operating time at which the indicated pressure of the first accumulator decreases, to positively carry out and promote the reduction of the fuel pressure in the first accumulator, and thereby enable the fuel pressure in the first accumulator to attain the indicated level early, minimize a response delay of an actual pressure therein with respect to the indicated pressure to be minimized, and the exhaust gas characteristics and fuel performance to be improved.

It is preferable in this system that the fuel control means sets the control valve closing time to the time earlier by a predetermined period of time than the fuel injection nozzle opening time. This enables the injection pressure at an inlet of the fuel injection nozzle to be stabilized by the time a subsequent low-pressure injection operation is carried out, and the low-pressure injection of the fuel to be carried out excellently.

An accumulator type fuel injection system is provided with a first accumulator adapted to store therein a high-pressure fuel pressurized by a pump, a fuel injection nozzle connected to the first accumulator via a fuel passage and adapted to inject the fuel into a combustion chamber of an engine, a control valve adapted to control the discharging of the high-pressure fuel in the first accumulator into a downstream portion of the fuel passage, a second accumulator adapted to store therein a fuel the pressure of which is lower than the high-pressure fuel in the first accumulator, and connected via a branch passage to the portion of the fuel passage which is on the downstream side of the control valve, and a fuel control means adapted to open the control valve in the midst of a period in which the fuel injection nozzle is opened, close the control valve simultaneously with the closure of the fuel injection nozzle, set an indicated pressure, which relates to the second accumulator, in accordance with the operating condition of the engine, and delay the closing time of the control valve when a rate of variation of the indicated pressure is not lower than a predetermined level.

According to this accumulator type fuel injection system, when the variation rate of the indicated pressure is not lower than a predetermined level, the fuel pressure in the second accumulator is made to reach the indicated level in a short period of time by positively increasing the same fuel pressure with the control valve kept open even after the fuel injection nozzle has been closed, whereby it becomes possible to execute low-pressure injection which suits the operating condition of the engine, and improve the fuel consumption and exhaust gas characteristics.

In this system, it is preferable that the fuel control means sets the control valve closing time to the time earlier by a predetermined period of time than a subsequent fuel injection nozzle opening time. This enables the fuel pressure at an inlet of the fuel injection nozzle to be set to a stable low-level injection pressure between the time at which the control valve is closed and the time at which subsequent fuel injection is started in each fuel injection cycle, so that low-pressure injection can be executed properly in each fuel injection cycle.

DETAILED DESCRIPTION OF THE PREFERRED EMBODIMENTS

The preferred embodiments of the present invention will now be described in detail illustratively with reference to the drawings.

Figure 1:
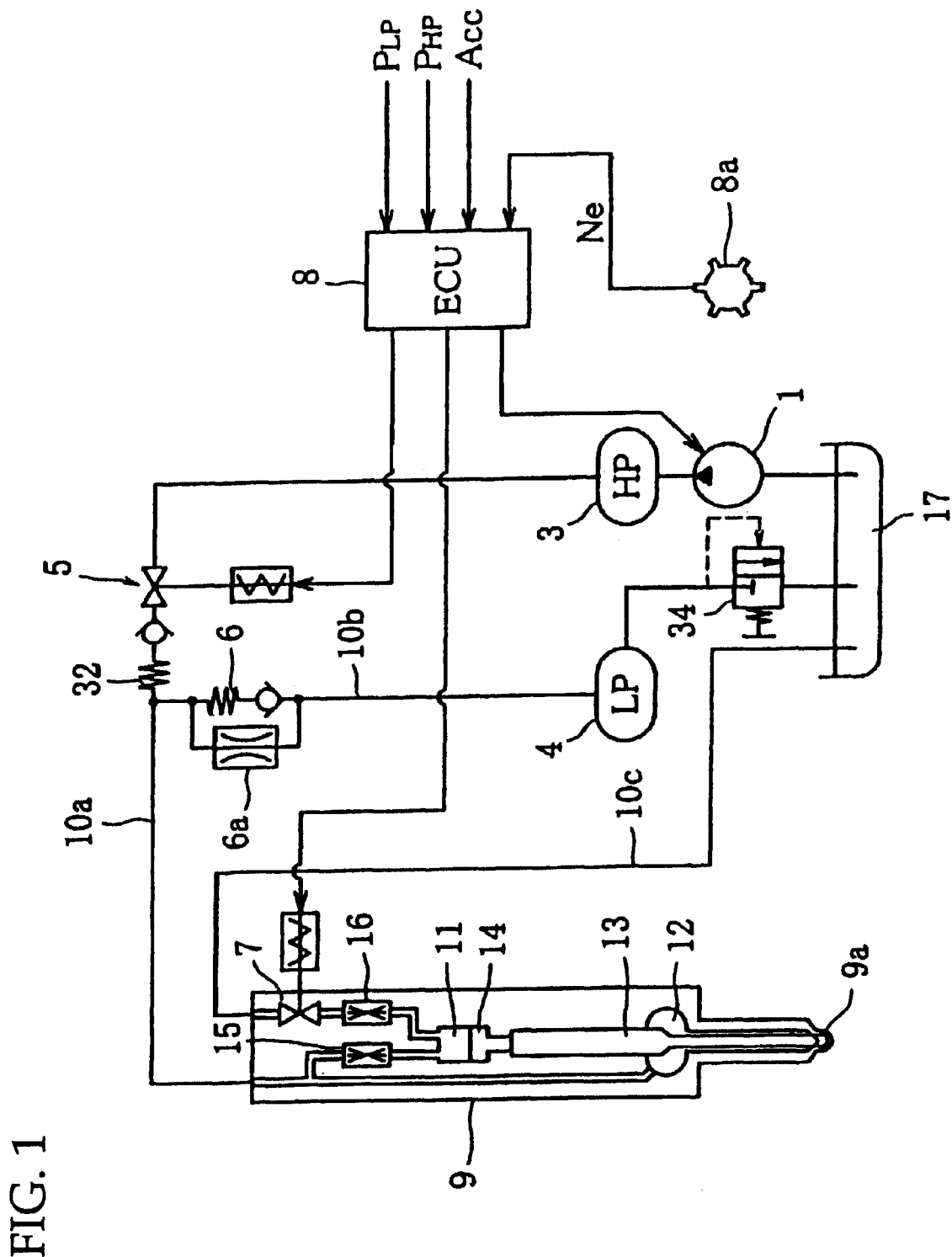
FIG. 1 is a schematic diagram showing an accumulator type fuel injection system on which the present invention is based.
Figure 2:
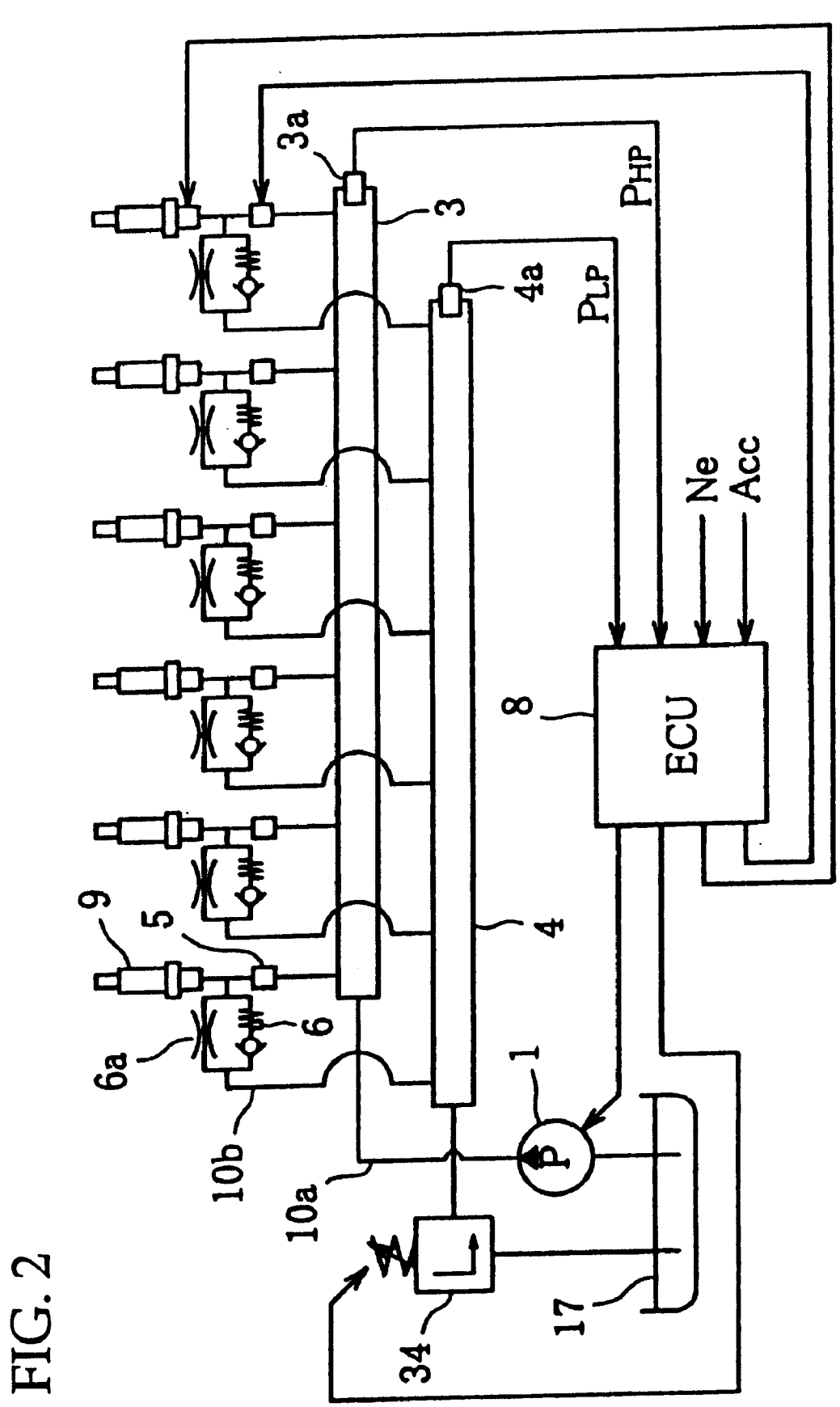
FIG. 2 is a schematic diagram showing the connection of primary elements of the fuel injection system shown in FIG. 1 with an injector for each cylinder of an engine.

FIG. 1 is a schematic construction diagram of an accumulator type fuel injection control apparatus as an embodiment of the present invention, and FIG. 2 a schematic diagram showing the connection of primary elements of the fuel injection control apparatus shown in FIG. 1 with an injector for each cylinder of an engine.

Figure 3:
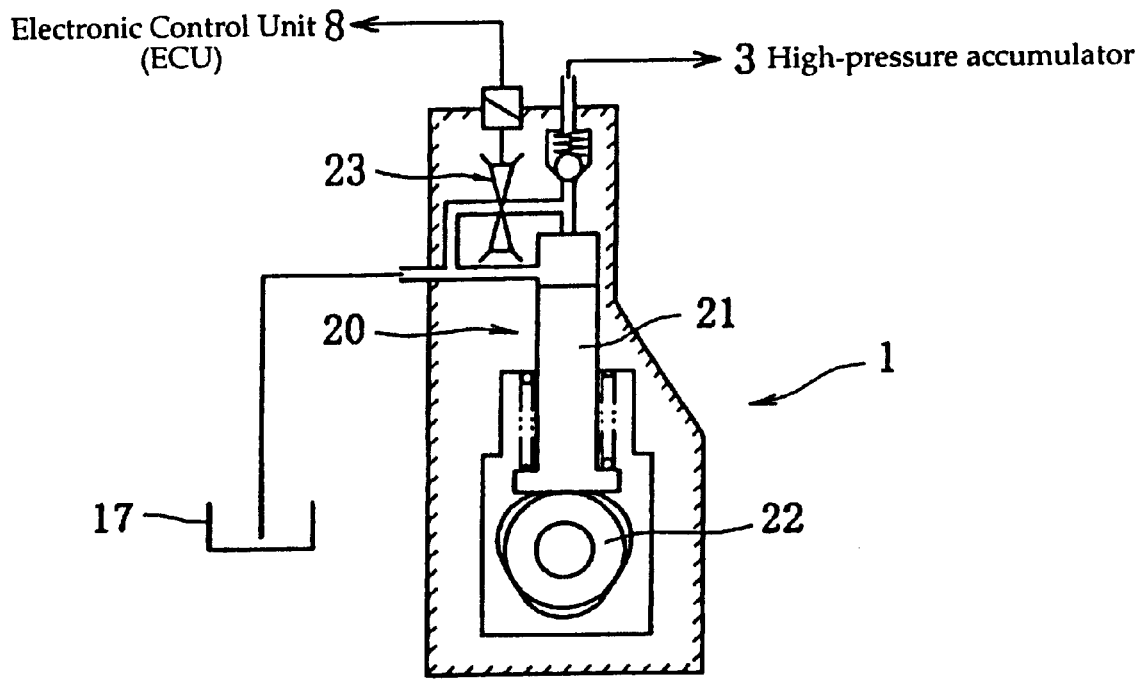
FIG. 3 is a schematic diagram of a high-pressure pump shown in FIG. 1.

Referring to FIGS. 1 and 2, the accumulator type fuel injection control apparatus is mounted on, for example, a 6-series-cylinder diesel engine (not shown), and a high-pressure pump 1 is provided with, for example, two plunger pumps 20 shown in FIG. 3, which correspond to three front cylinder, and three rear cylinders respectively of the 6-series-cylinder diesel engine, cams 22 for driving a plunger 21 for the three front cylinders and a plunger 21 for driving the three rear cylinders being provided with three bulging portions, three force feed strokes being made while the shaft of the high-pressure pump 1 makes one full turn to force feed a fuel. The regulation of the force feed stroke is made by regulating the closing time of an electromagnetic valve 23 provided on the discharge side of the plunger pumps 20, and, while this electromagnetic valve 23 is opened, the force feed operations of the plunger pumps 20 are ineffective. The electromagnetic valve 23 is controlled by an electronic control unit 8 which will be described later.

Returning to FIG. 1, the electronic control unit (ECU) 8 as a fuel control means for the accumulator type fuel injection control apparatus controls the electromagnetic valve 23 in the high-pressure fuel pump 1 in accordance with an engine speed Ne detected by an engine speed sensor 8*a* and an accelerator pedal stepping amount (degree of opening of the accelerator) Acc detected by a degree of opening of accelerator sensor (not shown) to variably regulate the force feed stroke, and feedback controls the force feed stroke (discharge pressure) in accordance with a fuel pressure $P_{HP}$ detected by a pressure sensor 3*a* provided on a high-pressure accumulator 3, whereby a high-pressure fuel suiting the operating condition of the engine is obtained.

The fuel pressurized by the high-pressure pump 1 is stored in the high-pressure accumulator 3. This high-pressure accumulator 3 is common to all cylinders, and communicates with a fuel passage 10*a*. In an intermediate portion of the fuel passage 10*a*, a fuel injection rate switching change-over valve (first control valve) 5 comprising, for example, a two-way electromagnetic valve is provided (FIG. 2) correspondingly to each cylinder with a check valve 32 which permits a fuel to flow only from the upstream side to the downstream side provided on the immediate downstream side of the change-over valve 5.

A low-pressure accumulator (second accumulator) 4 common to all cylinders is connected via a fuel passage 10*b*, which branches from the fuel passage 10*a*, to the portion of the fuel passage 10*a* which is on the downstream side of the check valve 32. In an intermediate portion of the fuel passage 10*b*, a check valve 6 and a bypass passage shunting the check valve 6 are provided, an orifice 6*a* being provided in this bypass passage. The check valve 6 is adapted to allow a fuel to flow only from the low-pressure accumulator 4 toward the fuel passage 10*a*. When the fuel pressure in the fuel passage 10*a* is higher than that in the fuel passage 10*b*, the fuel in the fuel passage 10*a* flows into the fuel passage 10*b* through the orifice 6*a*, and then into the low-pressure accumulator 4. Between the low-pressure accumulator 4 in the fuel passage 10*b* and a fuel tank 17, a pressure control valve (second control valve) 34 operated under the control of the electronic control unit 8 and adapted to control the fuel pressure in the low-pressure accumulator 4 is provided. As shown in FIG. 2, the low-pressure accumulator 4 is provided with a pressure sensor 4*a* for detecting a fuel pressure $P_{LP}$ therein.

The electronic control unit 8 is adapted to control the pressure control valve 34 on the basis of an actual pressure $P_{LP}$ detected by the pressure sensor 4*a*, in such manner that the fuel pressure in the low-pressure accumulator 4 attains a level which suits the operating condition of the engine represented by the engine speed Ne and accelerator pedal stepping amount Acc.

An injector 9 as a fuel injection nozzle provided in each cylinder of the engine has a pressure control chamber 11 connected to the fuel passage 10*a* via an orifice 15, and a fuel chamber (fuel reservoir) 12, the pressure control chamber 11 being connected to the fuel tank 17 via an orifice 16 and a fuel return passage 10*c*. A fuel injection time control switch valve 7 comprising, for example, a two-way electronic valve is connected to an intermediate portion of the fuel return passage 10*c*. The switch valve 7 may be provided in the injector.

The injector 9 has a needle valve 13 adapted to open and close a nozzle (injection port) 9*a*, and a hydraulic piston 14 housed slidably in the pressure control chamber 11, and needle valve 13 is urged to the side of the nozzle 9*a* by a spring (not shown) and closed. When the fuel is supplied from the fuel passage 10*a* to the pressure control chamber 11 and fuel chamber 12 with the injection time control switch valve 7 opened, a resultant force of the resilient force of the spring and the fuel pressure is imparted to the needle valve 13, so that the needle valve 13 closes the nozzle 9*a* against the fuel pressure in the fuel chamber 12. When the switch valve 7 is opened to cause the fuel in the pressure control chamber 11 to be discharged to the fuel tank 17 (atmosphere-opened side), the needle valve 13 is moved toward the hydraulic piston 14 against the resilient force of the spring due to the fuel pressure in the fuel chamber 12 to open the nozzle 9*a*, so that the fuel in the fuel chamber 12 is injected from the nozzle 9*a* into a combustion chamber of the engine.

The operation in a regular mode of the fuel injection system of the above-described construction will now be described.

The fuel pressure in the high-pressure accumulator 3 and that in the low-pressure accumulator 4 are controlled under the control of the electronic control unit 8 so that these fuel pressures suit the operating condition of the engine, and a fuel injection period (fuel injection starting and finishing time) and low-pressure injection period are set in accordance with the operating condition (engine speed and accelerator pedal stepping amount) of the engine.

Figure 4:
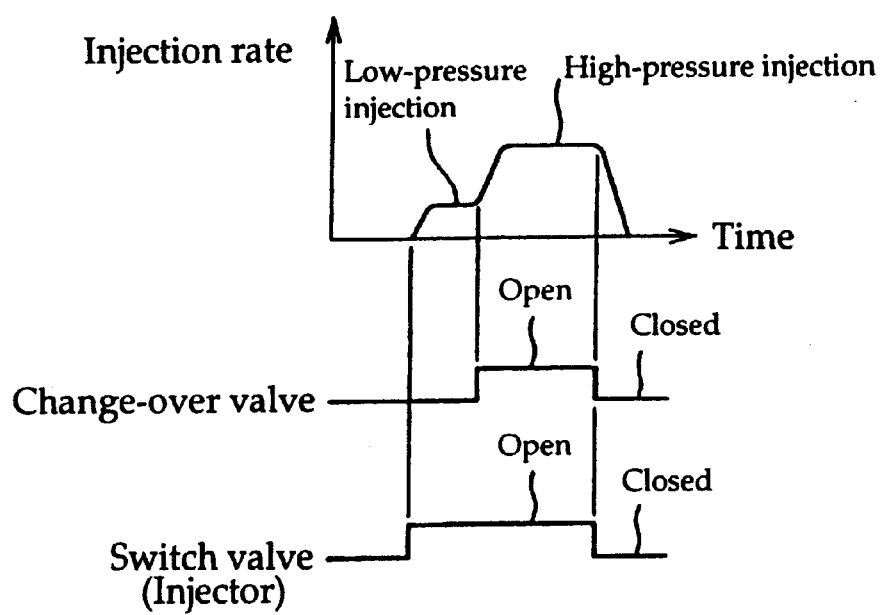
FIG. 4 is a diagram showing variation with the lapse of time of an injection rate and opened and closed condition of an injection rate switching change-over valve and an injection time control switch valve.

As shown in FIG. 4, the change-over valve 5 and switch valve 7 are all closed until the fuel injection starting time comes, and a low-pressure fuel is supplied from the low-pressure accumulator 4 to the portion of the fuel passage 10*a* which is on the downstream side of the change-over valve 5, and further to the pressure control chamber 11 and fuel chamber 12 of the injector 9. Since the switch valve 7 is closed, the fuel supplied to the interior of the pressure control chamber 11 is applied to the needle valve 13 via the hydraulic piston 14 to close the nozzle 9*a* with the needle valve 13, whereby the injector is closed.

When the fuel injection starting time comes, the switch valve 7 alone is opened, and the low-pressure fuel in the pressure control chamber 11 of the injector 9 is discharged to the fuel tank 17 through the orifice 16 and fuel return passage 10*c*. Consequently, when a resultant force of the fuel pressure imparted to the needle valve 13 via the hydraulic piston 14 and the resilient force of the spring becomes smaller than the fuel pressure in the fuel chamber 12 which works so as to lift the needle valve 13, the needle valve 13 moves up to cause the nozzle 9*a* to be opened, so that the low-pressure fuel is injected from the nozzle 9*a*. Namely, low-pressure injection of a comparatively low fuel injection rate (quantity of injected fuel per unit time) is executed in an initial injection stage. Owing to this low-pressure injection, the combustion in an initial stage of the fuel injection period is carried out comparatively slowly, and the reduction of the NOx content of an exhaust gas is attained.

When a predetermined period of time elapses after the starting of the low-pressure injection, the injection rate switching change-over valve 5 is opened with the injection time control switch valve 7 left open, and a high-pressure fuel is supplied to the fuel chamber 12, the high-pressure fuel being injected from the injector 9. Namely, high-pressure injection of an injection rate higher than that of the low-pressure injection is executed.

When the fuel injection finishing time comes, the injection time control switch valve 7 is closed, and the high-pressure fuel supplied from the fuel passage 10*a* to the pressure control chamber 11 through the orifice 15 works on the needle valve 13 via the hydraulic piston 14 to cause the needle valve 13 to close the nozzle 9a, so that the fuel injection from the nozzle 9a finishes. At the fuel injection finishing time, the fuel injection rate suddenly falls, and rates of discharge of black smoke and particulates (granular substances PM) from the engine is reduced. The injection rate switching change-over valve 5 is closed simultaneously with the closure of the switch valve 7 at the fuel injection finishing time, or at a point in time at which a predetermined period of time has elapsed after the fuel injection time was terminated.

Figure 5:
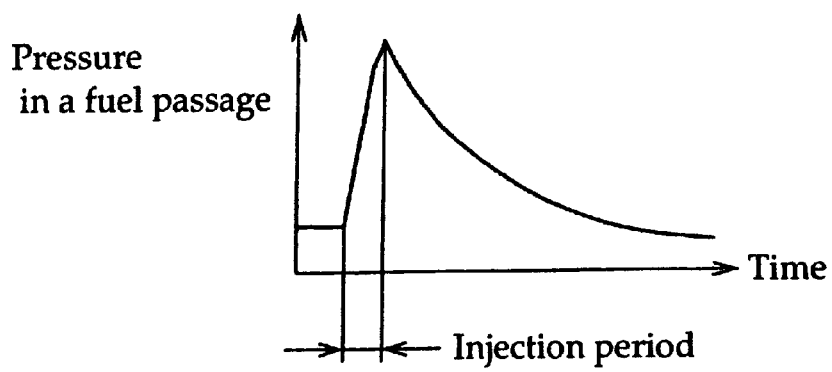
FIG. 5 is a diagram showing variation with the lapse of time of a fuel pressure in the portion of a fuel passage which is between the injector and change-over valve in one fuel injection cycle executed in a regular mode.
Figure 6:
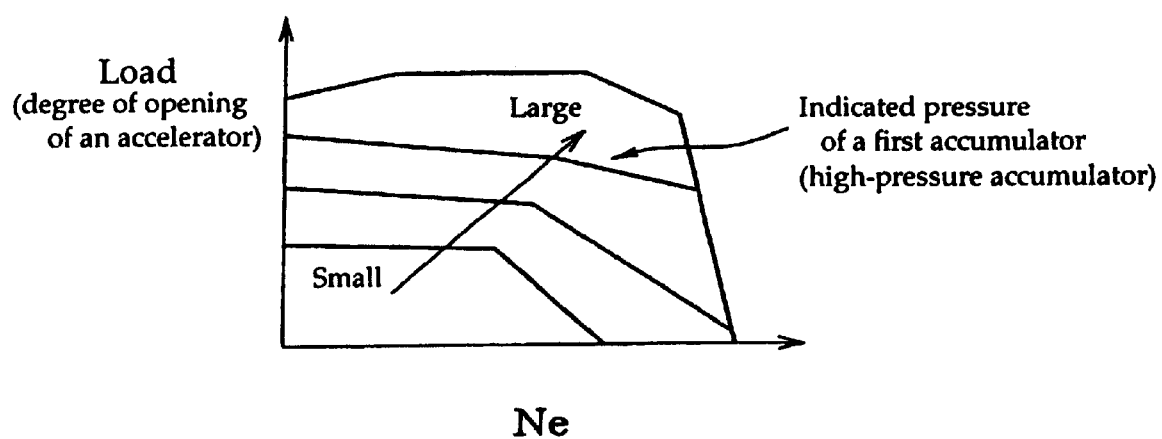
FIG. 6 is a characteristic diagram showing an example of a pressure map of a high-pressure accumulator.

Between the fuel chamber 12 of the injector 9 and the injection rate switching change-over valve 5, the high-pressure fuel in the fuel passage 10a flows into the low-pressure accumulator 4 through the orifice 6a of the fuel passage 10b, whereby the fuel pressure in the fuel passage 10a gradually decreases as shown in FIG. 5 from a point in time at which the fuel injection in each fuel injection cycle finishes, to a level which is set by the pressure control valve 34 by the time the fuel injection in a subsequent fuel injection cycle has been started, and which suits low-pressure injection, so that the injection rate in the subsequent low-pressure injection reaches a required level. FIG. 6 shows an example of a pressure map of the high-pressure accumulator 3, in which the pressure (fuel pressure) in the high-pressure accumulator 3 increases in accordance with an increase in a load (degree of opening of the accelerator) as shown by an arrow.

Figure 7:
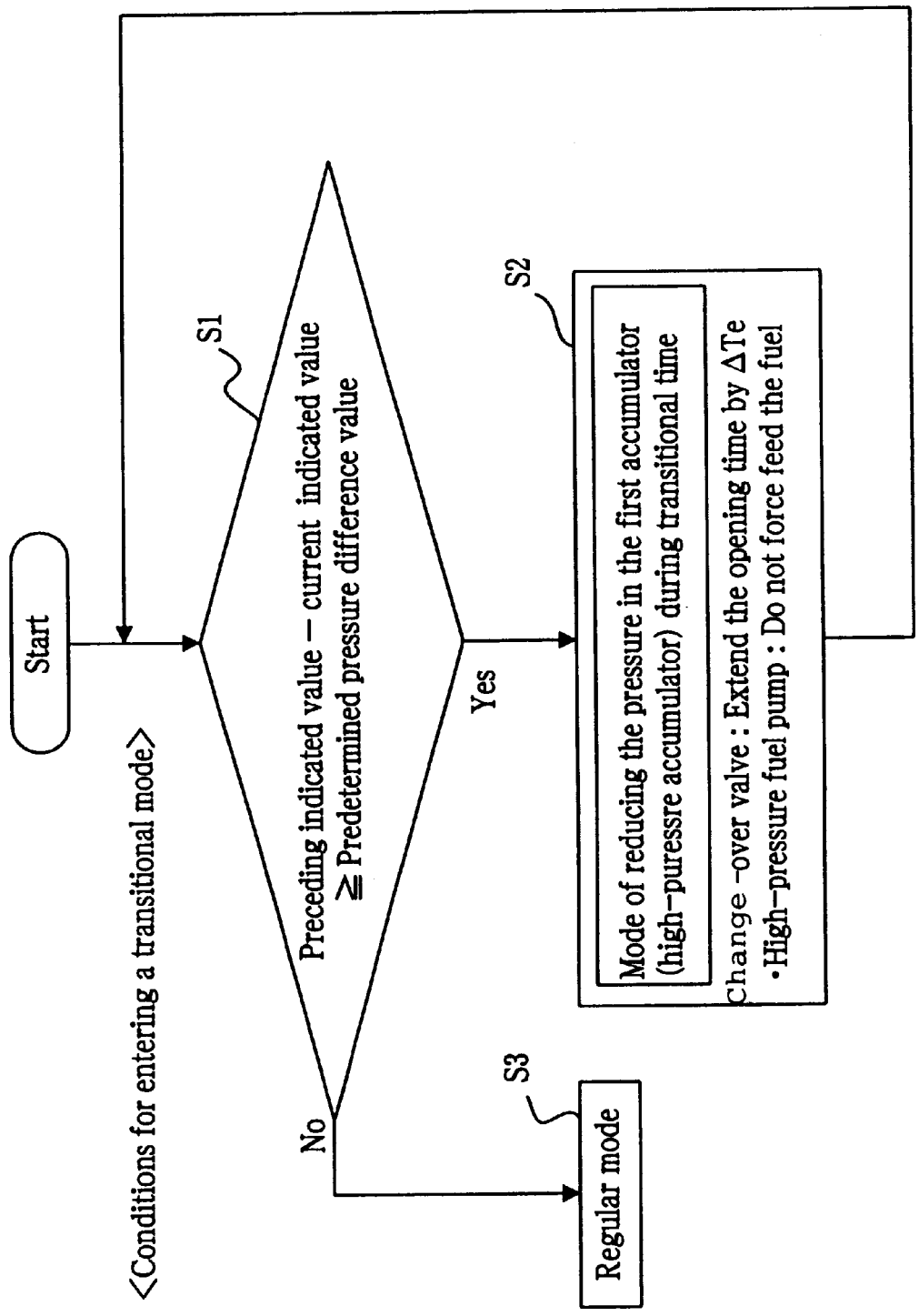
FIG. 7 is a flow chart showing the procedure for judging the arrival of a first transitional mode, and controlling the reduction of a fuel pressure in the high-pressure accumulator in the first transitional mode.

A pressure reduction control operation for the high-pressure accumulator 3 in a transitional operating time (first transitional operating mode) in which the engine load condition is transferred from a high-load condition to a low-load condition will now be described with reference to FIGS. 7 and 8. FIG. 7 is a flow chart showing procedures for judging the arrival of a first transitional mode and carrying out a pressure reduction control operation for the high-pressure accumulator in the first transitional mode, and FIG. 8 a timing chart showing a fuel injection waveform in the first transitional mode and the driving of the injector and change-over valve.

Assuming that, for example, the accelerator is returned during the traveling of a vehicle to cause the engine load condition to be transferred from a high-load condition to a low-load condition. When the accelerator 3 is returned, the electronic control unit 8 judges that a transitional time has come, sets an indicated pressure of the high-pressure accumulator 3 in accordance with the operating condition of the engine, judges (Step S1) on the basis of a signal from the pressure sensor 3a provided on the high-pressure accumulator 3 whether a rate of decrease in the indicated pressure of the high-pressure accumulator is not lower than a predetermined level, i.e. whether a difference between the preceding indicated pressure of the high-pressure accumulator 3 and the current indicated pressure thereof is not lower than the set level (preceding indicated pressure minus current indicated pressure equal to or greater than set pressure value), and transfer (Step S2) the operation mode to the transitional mode when the result of the judgement is affirmative (Yes). The judgement of the arrival of the first transitional mode may be made on the basis of the degree of opening of the accelerator.

In Step S2, the electronic control unit 8 executes a pressure reduction control operation for the high-pressure accumulator 3 in the transitional time. In the pressure reduction control operation for the high-pressure accumulator 3, the force feed operation of the high-pressure pump 1 is temporarily stopped, i.e., put in a non-force-feed-conducting state, the opening time of the change-over valve 5 (FIG. 1) being extended to increase the discharge rate of the fuel from the high-pressure accumulator 3 to the low-pressure accumulator 4 and thereby promote the reduction of the fuel pressure.

Figure 8:
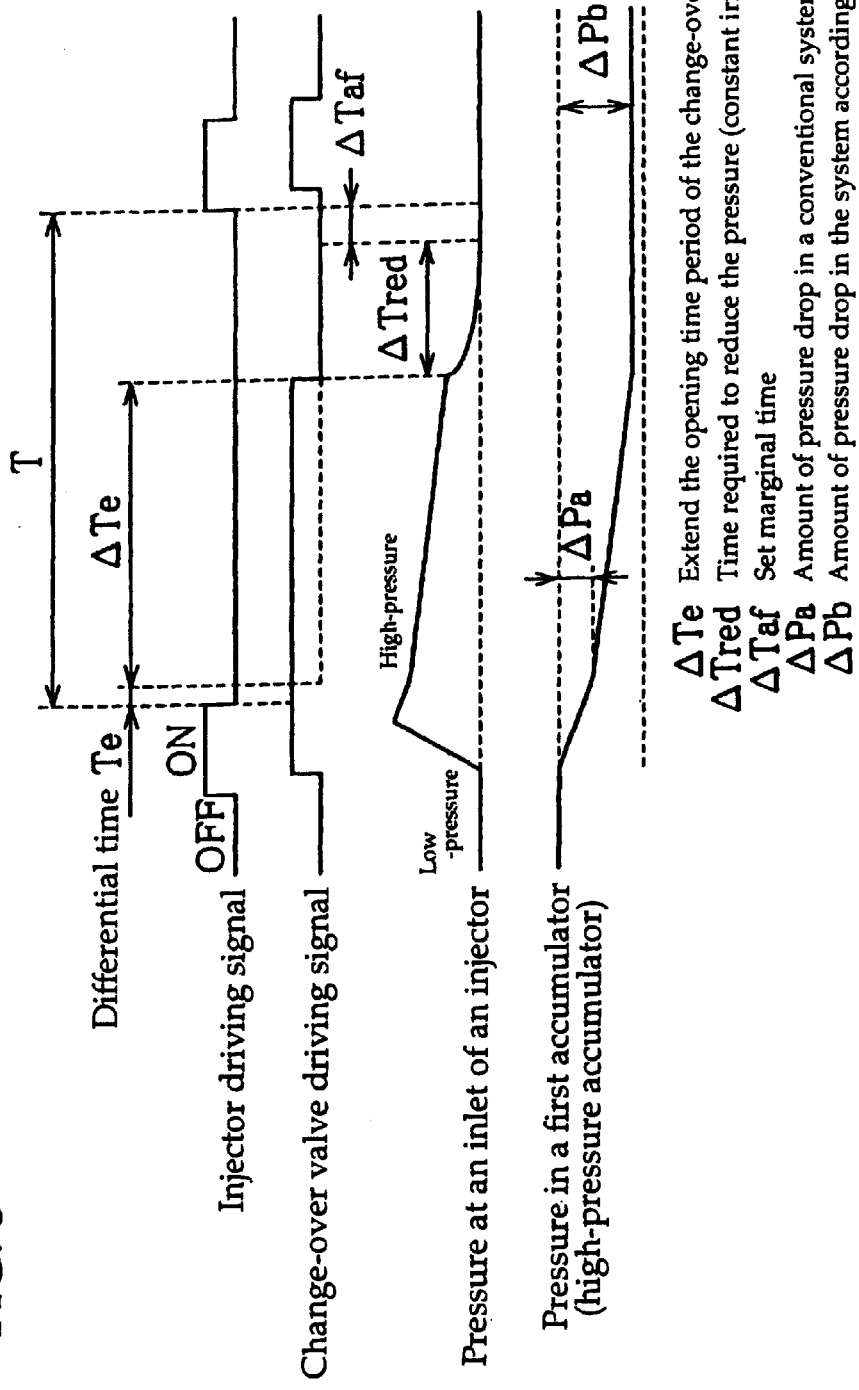
FIG. 8 is a timing chart showing a fuel injection waveform in the first transitional mode, and the driving of the injector and change-over valve.

As shown in FIG. 8, a driving signal for the change-over valve 5 in a regular mode is turned off as shown by a broken line after the differential time Te has elapsed after the driving signal was turned off. During this differential time Te, the high-pressure fuel flows from the high-pressure accumulator 3 into the low-pressure accumulator 4. The pressure control valve 34 is adapted to discharge the fuel which has flowed into the low-pressure accumulator 4 to the fuel tank 17, whereby the pressure in the low-pressure accumulator 4 is controlled to a predetermined level. Consequently, the pressure (pressure in the fuel passage 10a) at the inlet of the injector 9 and that in the high-pressure accumulator 3 decreases. However, when the differential time Te of the change-over valve 5 is short, the amount of high-pressure fuel flowing from the high-pressure accumulator 3 to the low-pressure accumulator 4 is small, so that the rate of pressure decrease (rate of pressure drop $\Delta Pa$) in the high-pressure accumulator 3 is low, which causes a response delay of pressure decrease in the high-pressure accumulator 3 in the transitional time.

Therefore, according to the present invention, the high-pressure pump 1 is put in a force feed stopping condition in the transitional time, and the opening time of the change-over valve 5 is extended (first embodiment). The stopping of a force feed operation of the high-pressure fuel pump 1 is done by opening the electromagnetic valve 23 shown in FIG. 3. The extension of the opening time of the change-over valve 5 is carried out by computing maximum extension time $\Delta Te$ of the change-over valve 5 within the time T which is between the time of current injection finishing time of the injector 9 and the subsequent injection starting time as shown in FIG. 8. Since the injector 9 is driven once per two revolutions of a crankshaft of the engine, the maximum extension time $\Delta Te$ is given by the time ($\Delta Te=120/Ne-$ (injection period)$-(\Delta Taf+\Delta Tred))$ determined by subtracting the injection period, set marginal time $\Delta Taf$ and time $\Delta Tred$ (constant irrespective of the engine speed) required to reduce the pressure from an injection cycle (120/Ne) given by the engine speed Ne. When the maximum extension time is thus computed, effective extension time corresponding to the operating condition (each load) of the engine can be determined.

The electronic control unit 8 opens the electromagnetic valve 23 of the fuel pump 1 to temporarily stop (the force feeding of the fuel is not carried out) the fuel supply to the high-pressure accumulator 3 and open the change-over valve 5 during the maximum extension time $\Delta Te$ which is after the closure of the injector 9. Consequently, the flow rate of the high-pressure fuel supplied from the, high-pressure accumulator 3 to the low-pressure accumulator 4 increases. The pressure control valve 34 discharges the high-pressure fuel which has flowed into the low-pressure accumulator 4 into the fuel tank 17 to control the pressure in the low-pressure accumulator 4 to a predetermined level. Thus, in the transitional operating time, in which the engine load becomes smaller, the flow rate of the fuel from the high-pressure accumulator 3 to the low-pressure accumulator 4 is increased to positively carry out the reduction of the fuel pressure in the high-pressure accumulator 3, whereby the heightening of the rate of pressure decrease (rate of pressure drop) $\Delta Pb$ in the high-pressure accumulator 3 is promoted to have the same fuel pressure reach the indicated level early. This enables a response delay of an actual pressure with respect to the indicated pressure of the high-pressure accumulator 3 to be minimized, and the exhaust gas and fuel performance to be improved.

The reducing of the pressure in the high-pressure accumulator 3 is done until the pressure in the low-pressure accumulator 4 has attained a predetermined level, and the time during which the change-over valve 5 is opened is up to a point in time which is a predetermined period of time (ΔTaf+ΔTred) before the subsequent opening time of the injector 9. When the closing time of the change-over valve 5 is set to the time earlier than the subsequent opening time of the injector 9 by a predetermined period of time (ΔTaf+ ΔTred), the injection pressure at the inlet of the injector 9 can be stabilized by the time the subsequent low-pressure injection is started, and the low-pressure injection can be executed excellently.

Returning to FIG. 7, when the result of judgement in Step S1 is negative (No), i.e., when a judgement that the rate of decrease in the indicated pressure in the high-pressure accumulator 3 is lower than a predetermined level is given, the electronic control unit 8 finishes the first transitional mode, and transfers (Step S3) the mode to a regular mode.

Figure 9:
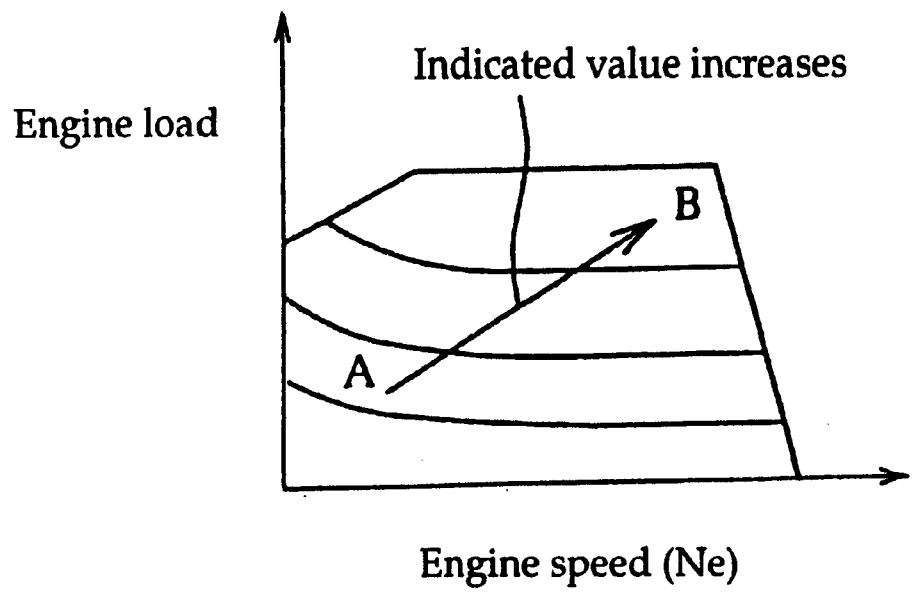
FIG. 9 is a diagram showing increasing variation of an indicated value, which relates to a low-pressure fuel in a low-pressure accumulator, in accordance with that of engine load and speed.
Figure 10:
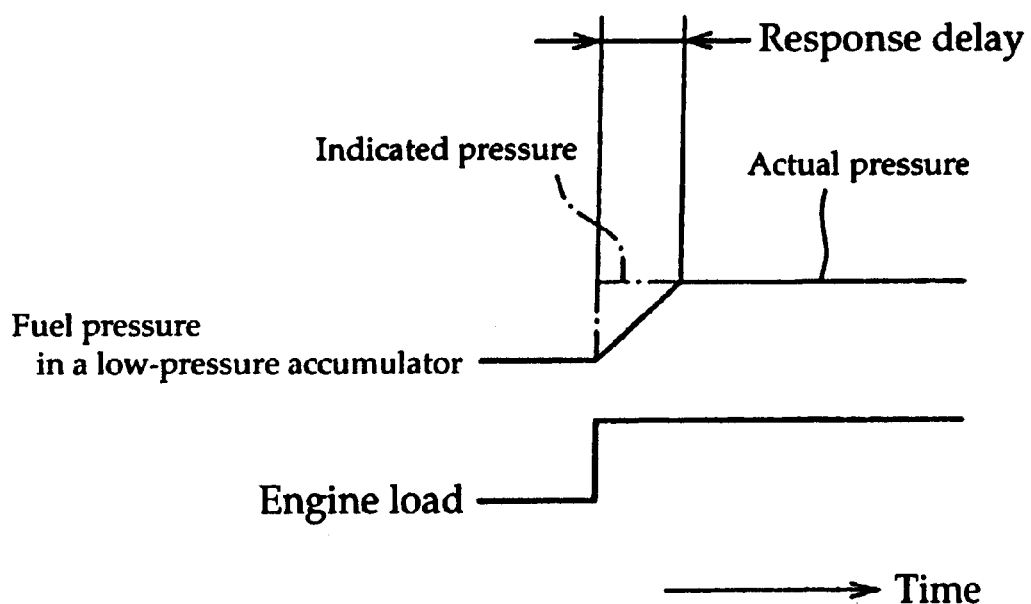
FIG. 10 is a diagram showing variation of the indicated value in accordance with that of an engine load, and a response delay of an actual pressure with respect to the indicated value.

When the accelerator pedal has come to be stepped suddenly by a driver during an operation of the engine, in other words, when an accelerating operation from, for example, the engine operating condition shown by a reference letter A in FIG. 9 to the condition shown by a reference letter B is requested, a target engine load increases suddenly in quick response to this request for an accelerating operation as shown in FIG. 10, and the indicated value, i.e. the indicated level of the fuel pressure in the low-pressure accumulator 4 increases in accordance with the sudden increase in the target load. When a change-over valve opening and closing control operation in the above-mentioned regular mode is carried out even in such a transitional operation of the engine, the actual fuel pressure in the low-pressure accumulator 4 merely increases in a considerably delayed state as shown in FIG. 10. When the formation of a fuel pressure in the low-pressure accumulator 4 is thus delayed after a request for an accelerating operation has thus been made, low-pressure injection in response to the variation of the operating condition of the engine cannot be executed, and an excellent engine performance cannot be obtained.

Therefore, in the accumulator type fuel injection system according to the present invention, a change-over valve opening and closing control operation in a second transitional mode which is different from the above-mentioned regular mode is carried out during an accelerating operation of the engine to promote the formation of fuel pressure in the low-pressure accumulator, and enable proper low-pressure injection to be executed early (second embodiment).

Figure 11:
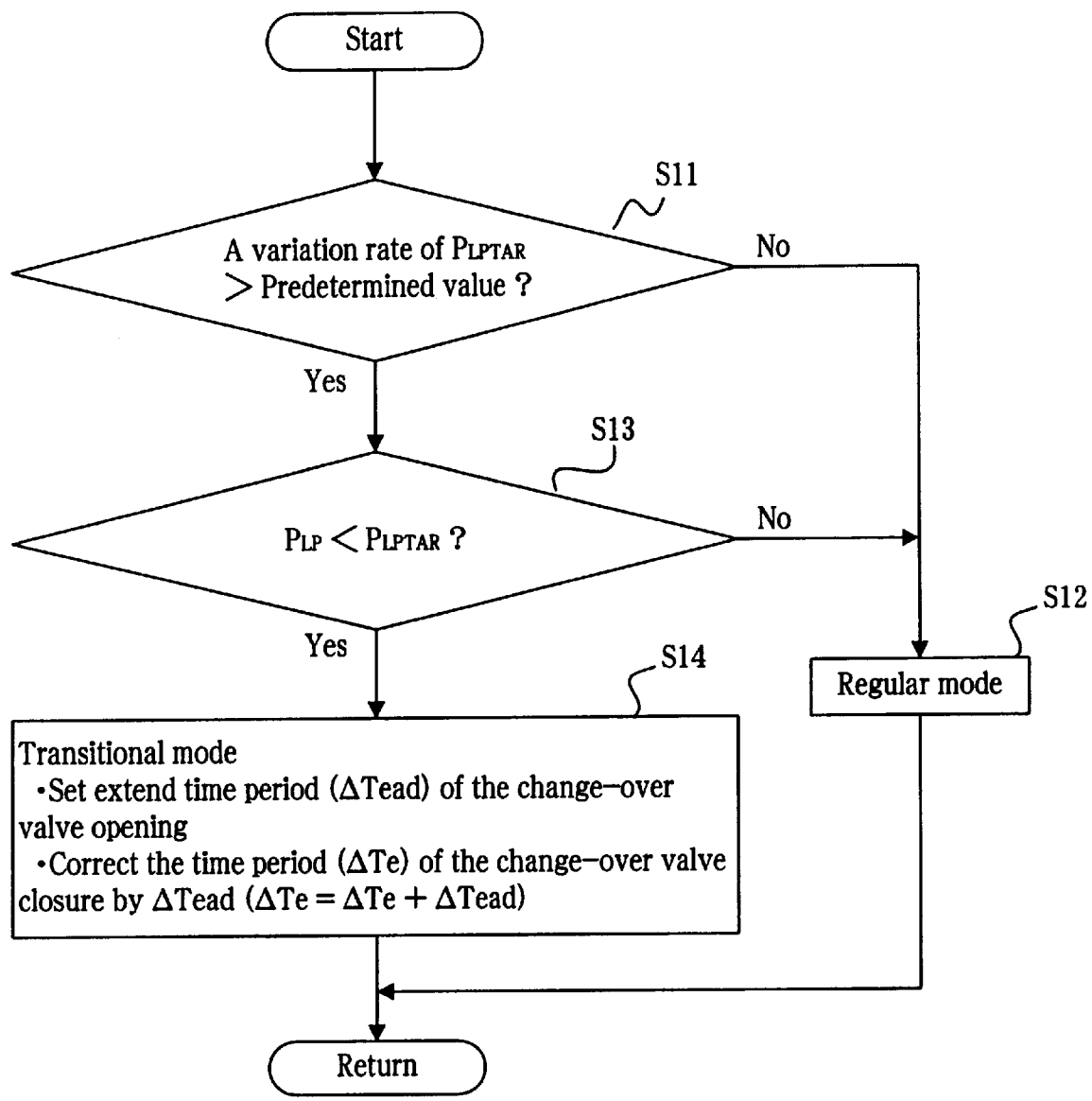
FIG. 11 is a flow chart showing the judgement of a second transitional mode, and the procedure for carrying out a control operation in the second transitional mode.

During the operation of the engine in this embodiment, an electronic control unit 8 executes a control mode judgement routine shown in FIG. 11 in a predetermined cycle. In an indicated pressure calculation routine (not shown) executed in parallel with this judgement routine, a target value (indicated value) $P_{LPTAR}$ of a low-pressure fuel suiting the operating condition of the engine is selected from, for example, an engine operating condition and indicated pressure map (not shown) on the basis of, for example, an engine speed Ne and an accelerator pedal stepping amount Acc.

In the judgement routine of FIG. 11, the variation amount of the indicated pressure from the preceding cycle to the current cycle is determined on the basis of an indicated pressure $P_{LPTAR}(n)$ of the low-pressure fuel calculated in the current cycle of the above-mentioned calculation routine and a calculated value $P_{LPTAR}(n-1)$ in the preceding cycle thereof. A variation rate $dP_{LPTAR}$ of the indicated pressure is further determined by dividing this variation amount of the indicated pressure by a calculation routine execution cycle. This variation rate $dP_{LPTAR}$ is then judged as to whether it exceeds a set level or not (Step S11).

The set value regarding the variation rate of the indicated pressure is a variation rate of an upper permissible limit which does not cause a non-acceptable delay to occur in a response of the actual pressure with respect to the low-pressure fuel even when a change-over valve opening and closing control operation in a regular mode is executed, and this variation rate is determined in advance, for example, by conducting experiments. Therefore, when a change-over valve opening and closing control operation is carried out in a case where the variation rate of the indicated pressure exceeds the set level, a non-acceptable delay occurs in a response of the actual pressure with respect to the indicated pressure, and low-pressure injection suiting the operating condition of the engine cannot be carried out in some cases. When the variation rate of the indicated pressure is not higher than the set level, a non-acceptable response delay does not occur even when a change-over valve opening and closing control operation is carried out in a regular mode, and low-pressure injection suiting the operating condition of the engine can be carried out. When the result of judgement in Step S11 is negative (No), i.e., when the variation rate of the indicated pressure does not exceed the set level, a judgement that a response delay obstructing proper low-pressure injection does not occur even when the change-over valve opening and closing control operation is carried out in a regular mode is carried out is given, and the already-described change-over valve opening and closing control operation in a regular mode and fuel injection control operation are carried out (Step S12).

When a judgement that the variation rate of the indicated pressure exceeds the set level is given in Step S11, an output $P_{LP}$ from a pressure sensor 4a which represents the actual fuel pressure in the low-pressure accumulator 4 is read, and the actual pressure $P_{LP}$ is judged (Step S13) as to whether it is lower than the indicated pressure $P_{LPTAR}$ or not.

When a judgement that the actual pressure $P_{LP}$ is not lower than the indicated pressure $P_{LPTAR}$ is given in Step 13, it is construed as a judgement that low-pressure injection can be carried out properly even when the change-over valve opening and closing control operation is carried out in a regular mode, so that the change-over valve opening and closing control operation in a regular mode and the fuel injection control operation are carried out (Step S12).

When the result of judgement in Step S13 is affirmative (Yes), i.e., when a judgement that the actual pressure PLP is lower than the indicated pressure PLPTAR is given in Step S13 following the judgement that the variation rate of the indicated pressure exceeds the set level given in Step S11, it is construed as a judgement that, when the change-over valve opening and closing control operation in a regular mode keeps being carried out, a non-acceptable delay occurs in a response of the actual pressure with respect to the indicated pressure to render it unable to carry out a proper low-pressure injection operation, so that the operation mode is transferred to a second transitional mode (Step S14).

In the second transitional mode, an injection time control switch valve 7 is driven at such time that permits obtaining a fuel injection period suiting the operating condition of the engine, and the pressurized fuel in a fuel chamber 12 is injected from a nozzle port of an injector 9 while the switch valve 7 is opened. The opening of an injection rate switching change-over valve 5 is timed in the same manner as in a regular mode, and the low-pressure injection is switched at this time to high-pressure injection. The time at which the change-over valve 5 is closed is set to the time later than that in a regular mode. In this embodiment, a predetermined period of time ΔTe between the fuel injection finishing time (point in time at which an injector driving signal falls) and the change-over valve closing time (point in time at which a change-over valve driving signal falls) is extended by extension time ΔTesad.

Accordingly, the time for supplying a pressurized fuel from the high-pressure accumulator 3 to the low-pressure accumulator 4 via a fuel passage 10a and an orifice 6a becomes longer than flat in a regular mode, and the supplying of the pressurized fuel to the low-pressure accumulator 4 is carried out positively while the change-over valve 5 is opened even after the injector 9 is closed. Consequently, an increased portion of the fuel pressure in the low-pressure accumulator 4 in the second transitional mode becomes large as shown by a solid line in FIG. 12 as compared with that (broken line) in a case where the change-over valve opening period is not extended. Thus, in the second transitional mode, the formation of fuel pressure in the low-pressure accumulator 4 is promoted, and the fuel pressure in the second accumulator reaches in a short period of time the indicated level corresponding to the operating condition of the engine in a transitional operation.

Figure 12:
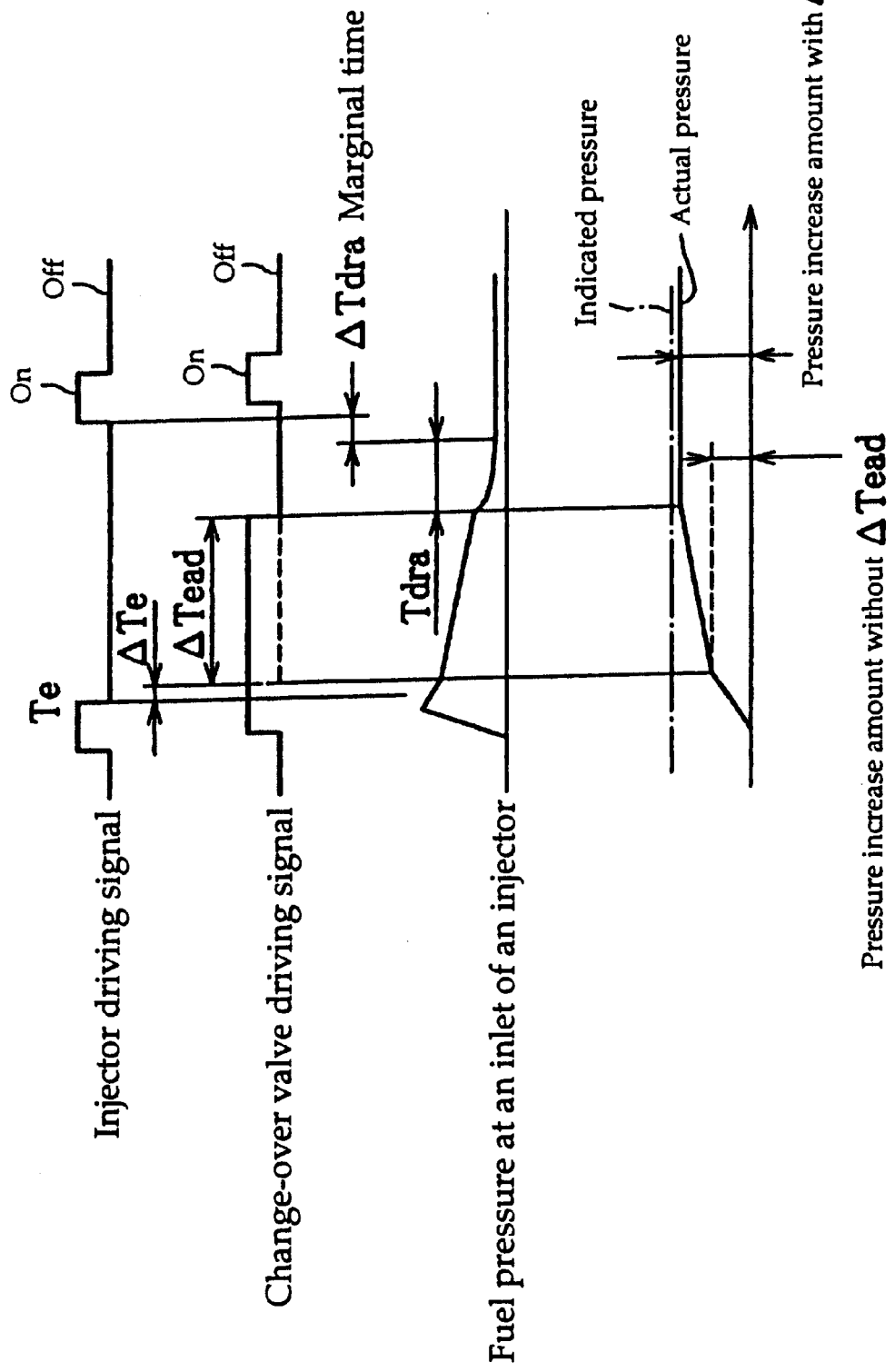
FIG. 12 is a diagram showing variations with the lapse of time of an injector driving signal, a change-over valve driving signal, a fuel pressure at an inlet of the injector and a fuel pressure in the low-pressure accumulator during a fuel injection control operation in the second transitional mode.

FIG. 12 shows for the convenience of illustration a case where the pressure of the low-pressure fuel reaches an indicated level owing to the extending of the change-over valve opening period in only a fuel injection cycle which follows immediately after the execution of transfer of the operation mode to the second transitional mode. When a rate of variation of the indicated value of the low-pressure fuel is high, the change-over valve opening period may be extended in a plurality of fuel injection cycles in some cases after the execution of transfer of the operation mode to the second transitional mode.

In this embodiment, the closing time of the change-over valve 5 is set to the time earlier than a subsequent opening of the injector 9 by a period of time equal to the sum of a predetermined period Tdra and a marginal period ΔTdra. The predetermined period Tdra corresponds to the time required by the fuel pressure in the fuel passage 10a, i.e. the fuel pressure in the combustion chamber (inlet of the injector) of the injector to decrease after the closure of the change-over valve 5 to a level at which low-pressure injection is executed. This predetermined period Tdra can be determined, for example, by conducting experiments.

When the change-over valve 5 is thus closed at the time earlier than subsequent fuel injection starting time by at least the predetermined period Tdra, the fuel pressure at the inlet of the injector can be set stably to a level substantially equal to that of the low-pressure injection pressure. As a result, low-pressure injection in each fuel injection cycle is carried out properly, and the fuel consumption and exhaust gas characteristics are improved.

When a judgement that the actual pressure $P_{LP}$ in the low-pressure accumulator 4 exceeds the indicated pressure $P_{LPTAR}$ is given in Step S13 of the judgement routine of FIG. 11, it is construed as a judgement that the formation of a fuel pressure in the low-pressure accumulator 4 is completed, and the operation mode is transferred to a regular mode.

The present invention is not limited to the above-described embodiments, and can be modified variously.

For example, in the second embodiment, the variation rate of the indicated pressure is determined directly on the basis of the amounts of variation of the current and preceding indicated pressures $P_{LPTAR}$, and a judgement that "request for accelerated operation is made" is given when the variation rate of the indicated pressure has exceeded a set level, the operation mode being transferred a transitional mode when the actual pressure $P_{LP}$ is lower than the indicated level, to extend the opening time of the change-over valve. A judgement that "request for accelerated operation is made" may be given when something, instead of the above-mentioned variation rate, representative of a degree of variation of the operating condition of an engine, for example, a variation rate of the accelerator pedal stepping amount has exceeded a set level. In other words, the variation rate of the indicated pressure may be determined indirectly on the basis of that of the accelerator pedal stepping amount.

Of course, the constitution of the first and second embodiments may be provided independently, or the constitution of both thereof at once.

What is claimed is:

1. An accumulator type fuel injection control system comprising:

a first accumulator adapted to store therein a high-pressure fuel pressurized by a fuel pump, a fuel injection nozzle connected to said first accumulator via a fuel passage and adapted to inject the fuel into a combustion chamber of an engine, a control valve adapted to control the discharging of the high-pressure fuel in said first accumulator into a downstream portion of said fuel passage, a second accumulator adapted to store therein a fuel the pressure of which is lower than that of the high-pressure fuel in said first accumulator, and a fuel control device adapted to open said control valve during a period in which said fuel injection nozzle is opened, close said control valve simultaneously with the closure of said fuel injection nozzle, set an indicated pressure of the fuel in said first accumulator in accordance with a subsequent operating condition of said engine, and delay the closing time of said control valve when a rate of decrease of the indicated pressure is not lower than a predetermined level.

2. An accumulator type fuel injection control system according to claim 1, wherein said fuel control device sets the closing time of said control valve to a time earlier by a predetermined period of time than the opening time of said fuel injection nozzle.

3. An accumulator type fuel injection system comprising:

a first accumulator adapted to store therein a high-pressure pressurized by a fuel pump, a fuel injection nozzle connected to said first accumulator via a fuel passage and adapted to inject the fuel into a combustion chamber of an engine, a control valve adapted to control the discharging of the high-pressure fuel in said first accumulator into a downstream portion of said fuel passage, a second accumulator adapted to store therein a fuel the pressure of which is lower than the high-pressure fuel in said first accumulator, and connected via a branch passage to a portion of said fuel passage which is on a downstream side of said control valve, and a fuel control device adapted to open said control valve in the midst of a period in which said fuel injection nozzle is opened, close said control valve simultaneously with the closure of said fuel injection nozzle, set an indicated pressure, which relates to said second accumulator, in accordance with the operating condition of said engine, and delay the closing time of said control valve when a rate of variation of the indicated pressure is not lower than a predetermined level.

4. An accumulator type fuel injection system according to claim 3, wherein said fuel control device sets the closing time of said control valve to a time earlier by a predetermined period of time than a subsequent opening time of said fuel injection nozzle.

5. An accumulator type fuel injection control system comprising:

first accumulator means for storing therein a high-pressure fuel pressurized by a fuel pump, fuel injection means connected to said first accumulator means via a fuel passage for injecting the fuel into a combustion chamber of an engine, control valve means for controlling the discharge of the high-pressure fuel in said first accumulator means into a downstream portion of said fuel passage, second accumulator means for storing therein a fuel the pressure of which is lower than that of the high-pressure fuel in said first accumulator means, and a fuel control means for controlling said control valve means to discharge the high-pressure fuel during a period in which said fuel injection means injects fuel into the combustion chamber, controlling said control valve means to simultaneously stop discharge when said fuel injection means stops injection, setting an indicated pressure of the fuel in said first accumulator means in accordance with the operating condition of said engine, and delaying the stopping of the discharge by said control valve means when a rate of decrease of the indicated pressure is not lower than a predetermined level.

6. An accumulator type fuel injection control system according to claim 5, wherein said fuel control means sets a time for discontinuing discharge by said control valve means to a time earlier by a predetermined period of time for starting a subsequent injection starting time of said fuel injection means.

7. An accumulator type fuel injection control system comprising:

first accumulator means for storing therein a high-pressure fuel pressurized by a fuel pump, fuel injection means connected to said first accumulator means via a fuel passage for injecting the fuel into a combustion chamber of an engine, control valve means for controlling the discharge of the high-pressure fuel in said first accumulator means into a downstream portion of said fuel passage, second accumulator means for storing therein a fuel the pressure of which is lower than that of the high-pressure fuel in said first accumulator means, and connected via a branch passage to a portion of said fuel passage which is on a downstream side of said control valve means, and a fuel control means for controlling said control valve means to discharge the high-pressure fuel during a period in which said fuel injection means injects fuel into the combustion chamber, for controlling said control valve means to simultaneously stop discharge when said fuel injection means stops injection, setting an indicated pressure of the fuel, which relates to said second accumulator, in accordance with the operating condition of said engine, and delaying the stopping of the discharge by said control valve means when a rate of variation of the indicated pressure is not lower than a predetermined level.

8. An accumulator type fuel injection control system according to claim 7, wherein said fuel control means sets a time for discontinuing discharge by said control valve means to a time earlier by a predetermined period of time for starting a subsequent injection starting time of said fuel injection means.

9. A fuel injection method comprising:

storing a high-pressure fuel pressurized by a fuel pump within a first accumulator device, injecting the fuel into a combustion chamber of an engine using a fuel injection device which is coupled to the first accumulator device via a fuel passage, controlling the discharge of the high-pressure fuel in said first accumulator device into a downstream portion of said fuel passage with a control valve device, storing a fuel, the pressure of which is lower than that of the high-pressure fuel in said first accumulator device, within a second accumulator device, controlling said control valve device with a fuel control device to discharge the high-pressure fuel during a period in which said fuel injection device injects fuel into the combustion chamber, controlling said control valve device to simultaneously stop discharge when said fuel injection device stops injection, setting an indicated pressure of the fuel in said first accumulator device in accordance with the operating condition of said engine, and delaying the stopping of the discharge by said control valve device when a rate of decrease of the indicated pressure is not lower than a predetermined level.

10. An fuel injection method according to claim 9, wherein controlling the control valve device further comprises:

setting a time for discontinuing discharge by said control valve device to a time earlier by a predetermined period of time for starting a subsequent injection starting time of said fuel injection device.

11. A fuel injection method comprising:

storing a high-pressure fuel pressurized by a fuel pump within a first accumulator device, injecting the fuel into a combustion chamber of an engine with a fuel injection device that is connected to the first accumulator device via a fuel passage, controlling the discharge of the high-pressure fuel in said first accumulator device into a downstream portion of said fuel passage with a control valve device, storing within a second accumulator device a fuel whose pressure is lower than that of the high-pressure fuel in said first accumulator device, wherein the second accumulator is connected via a branch passage to a portion of said fuel passage which is on a downstream side of said control valve device, controlling said control valve device with a fuel control device to discharge the high-pressure fuel during a period in which said fuel injection device injects fuel into the combustion chamber, controlling said control valve device to simultaneously stop discharge when said fuel injection device stops injection, setting an indicated pressure of the fuel, which relates to said second accumulator, in accordance with the operating condition of said engine, and delaying the stopping of the discharge by said control valve device when a rate of variation of the indicated pressure is not lower than a predetermined level.

12. A fuel injection control method according to claim 11, wherein controlling said control valve device further comprises:

setting a time for discontinuing discharge by said control valve device to a time earlier by a predetermined period of time for starting a subsequent injection starting time of said fuel injection device.

* * * * *